(12) United States Patent
Murata et al.

(10) Patent No.: US 7,525,590 B2
(45) Date of Patent: Apr. 28, 2009

(54) CAMERA APPARATUS WITH EXPOSURE CORRECTION BASED ON MOVEMENT OF THE OBJECT

(75) Inventors: Haruhiko Murata, Takatsuki (JP); Toshiyuki Okino, Kadoma (JP)

(73) Assignee: Sanyo Electric Co., Ltd., Osaka (JP)

( * ) Notice: Subject to any disclaimer, the term of this patent is extended or adjusted under 35 U.S.C. 154(b) by 641 days.

(21) Appl. No.: 11/049,930

(22) Filed: Feb. 4, 2005

(65) Prior Publication Data

US 2005/0128343 A1  Jun. 16, 2005

Related U.S. Application Data

(63) Continuation of application No. 09/089,402, filed on Jun. 3, 1998, now abandoned.

(30) Foreign Application Priority Data

Jun. 5, 1997 (JP) .............................. 1997-147453

(51) Int. Cl.
*G03B 13/00* (2006.01)
*H04N 5/232* (2006.01)
(52) U.S. Cl. ..................... 348/352; 348/229.1; 348/362
(58) Field of Classification Search ................. 348/219, 348/231, 352, 362–364, 221.1, 29.12
See application file for complete search history.

(56) References Cited

U.S. PATENT DOCUMENTS

| 5,043,816 | A | * | 8/1991 | Nakano et al. ......... 348/333.01 |
| 5,053,875 | A | | 10/1991 | Ishii et al. |
| 5,103,254 | A | * | 4/1992 | Bell et al. ................... 396/147 |
| 5,210,566 | A | * | 5/1993 | Nishida ...................... 396/123 |
| 5,289,227 | A | * | 2/1994 | Kinjo ......................... 396/310 |
| 5,754,226 | A | | 5/1998 | Yamada et al. |
| 5,777,666 | A | * | 7/1998 | Tanase et al. ................. 348/43 |
| 5,969,761 | A | | 10/1999 | Takahashi et al. |

FOREIGN PATENT DOCUMENTS

| JP | 02-172366 | 3/1990 |
| JP | 06-165047 | 10/1994 |
| JP | 07-212636 | 11/1995 |

* cited by examiner

*Primary Examiner*—Tuan V Ho
*Assistant Examiner*—Gevell Selby
(74) *Attorney, Agent, or Firm*—Arent Fox LLP

(57) ABSTRACT

A camera apparatus includes an imaging device and a unit for detecting information relating to the movement of an object on the basis of an output of the imaging device. An exposure correction device is provided for making exposure correction on the basis of the detected information relating to the movement of the object.

12 Claims, 4 Drawing Sheets

CAMERA APPARATUS WITH EXPOSURE CORRECTION BASED ON MOVEMENT OF THE OBJECT

CROSS-REFERENCE TO RELATED APPLICATION

This is a Continuation Application of U.S. patent application Ser. No. 09/089,402, filed on Jun. 3, 1998 now abandoned. The disclosure of the prior application is hereby incorporated by reference herein in its entirety.

BACKGROUND OF THE INVENTION

1. Field of the Invention

The present invention relates to camera apparatuses such as an electronic still camera, a video camera, and a film camera.

2. Description of the Prior Art

A camera apparatus such as an electronic still camera generally has an auto exposure control (AE) function and an auto focus control (AF) function.

In the conventional auto exposure control, the shutter speed, the f-stop value, and the like are adjusted on the basis of the EV value (brightness). However, the movement of the hands, the speed of movement of a subject, and so forth are not considered. When the hands move or the speed of movement of the subject is high, a proper image is not obtained.

SUMMARY OF THE INVENTION

An object of the present invention is to provide a camera apparatus in which a proper image is obtained even in cases such as a case where the hands move and a case where the speed of movement of a subject is high.

A camera apparatus according to the present invention is characterized by comprising an imaging device, means for detecting information relating to the movement of an object on the basis of an output of the imaging device, and exposure correction means for making exposure correction on the basis of the detected information relating to the movement of the object.

An example of the exposure correction means is one for correcting the shutter speed on the basis of the detected information relating to the movement of the object.

An example of the exposure correction means is one for correcting the shutter speed and the diaphragm on the basis of the detected information relating to the movement of the object.

An example of the exposure correction means is one for correcting the shutter speed and the diaphragm as well as controlling the gain on the basis of the detected information relating to the movement of the object.

An example of the exposure correction means is one for correcting the shutter speed and the diaphragm as well as controlling the gain and the strobo flashing in a case where a shutter is released on the basis of the detected information relating to the movement of the object.

There may be provided means for temporarily storing a plurality of images picked up by the imaging device before and after the shutter is released, and retaining, when the shutter is released, only the picked-up image in which the movement of the object is the smallest out of the picked-up images temporarily stored before and after the shutter is released.

An example of the information relating to the movement of the object is motion vectors respectively corresponding to a plurality of detecting areas set in an imaging area of the imaging device.

According to the present invention, even in cases such as a case where the hands move and a case where the speed of the movement of a subject is high, a proper image is obtained.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
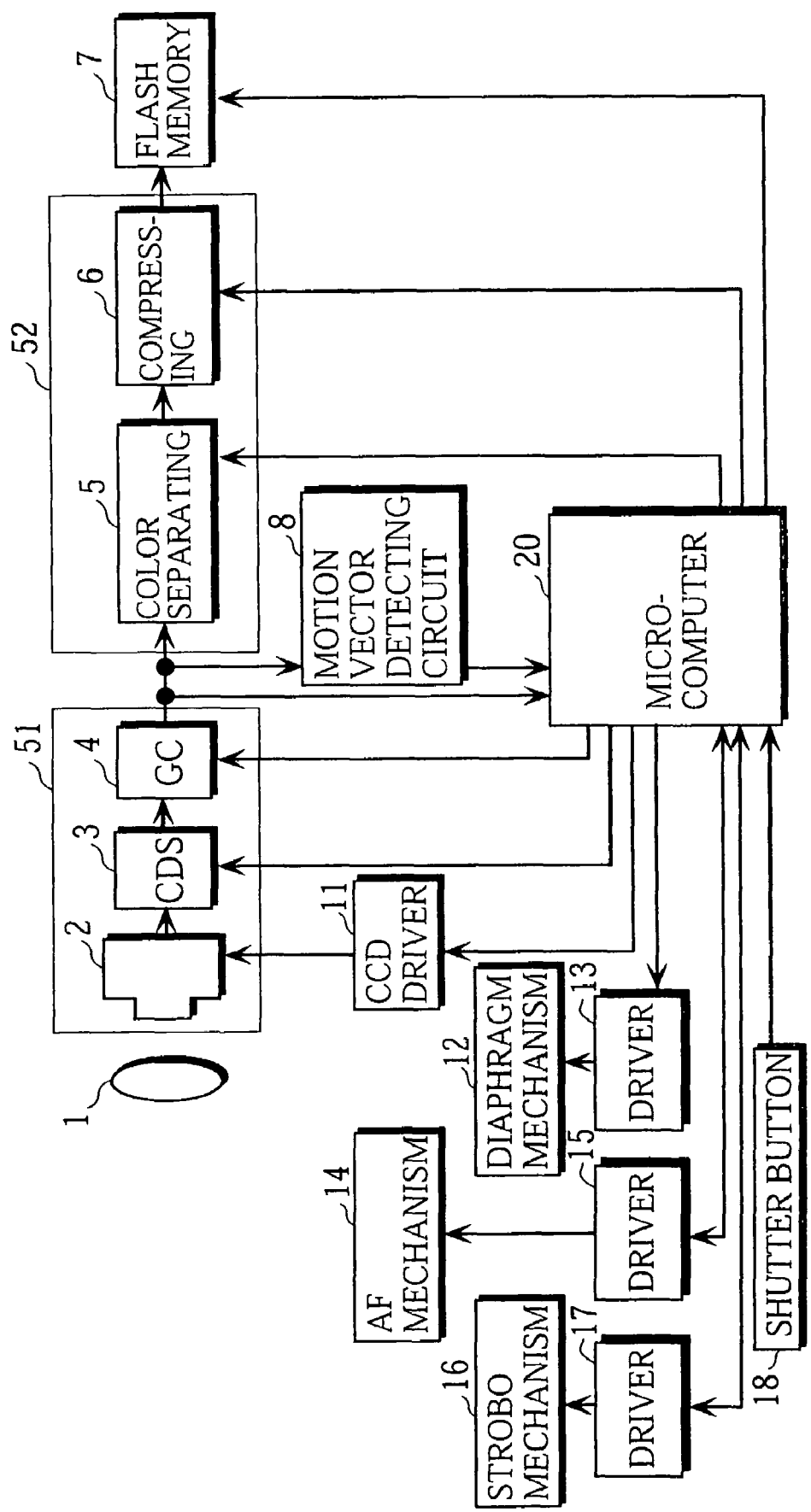
FIG. 1 is a block diagram showing the configuration of an electronic still camera.

Referring now to the drawings, an embodiment in a case where the present invention is applied to an electronic still camera will be described.

FIG. 1 illustrates the configuration of an electronic still camera.

In FIG. 1, reference numeral 1 denotes an optical system, and reference numeral 2 denotes a CCD (Charge Coupled Device) imaging device. Reference numeral 3 denotes a co-related double sampling (CDS) circuit, which is provided for removing noise peculiar to the CCD imaging device 2 from an output of the imaging device 2. Reference numeral 4 denotes a gain control (GC) circuit. The CCD imaging device 2, the CDS circuit 3 and the GC circuit 4 constitute a signal preprocessing unit 51.

Reference numeral 5 denotes a color separating circuit, which produces a luminance signal Y and color difference signals Cr and Cb on the basis of an output of the GC circuit 4. Reference numeral 6 denotes a compressing circuit, which subjects the luminance signal Y and the color difference signals Cr and Cb to JPEG (Joint Photographic Experts Group) compression. The color separating circuit 5 and the compressing circuit 6 constitute a main signal processing unit 52. Reference numeral 7 denotes a flash memory for recording compressed data. Reference numeral 8 denotes a motion vector detecting circuit for detecting motion vectors for each frame on the basis of the output of the GC circuit 4.

Reference numeral 11 denotes a CCD driver. Reference numeral 12 denotes a diaphragm mechanism, and reference numeral 13 denotes its driver. Reference numeral 14 denotes an AF mechanism for adjusting the position of a focusing lens, and reference numeral 15 denotes its driver. Reference numeral 16 denotes a strobo mechanism, and reference numeral 17 denotes its driver. Reference numeral 18 denotes a shutter button. Reference numeral 20 denotes a microcomputer for controlling the above-mentioned devices.

Figure 2:
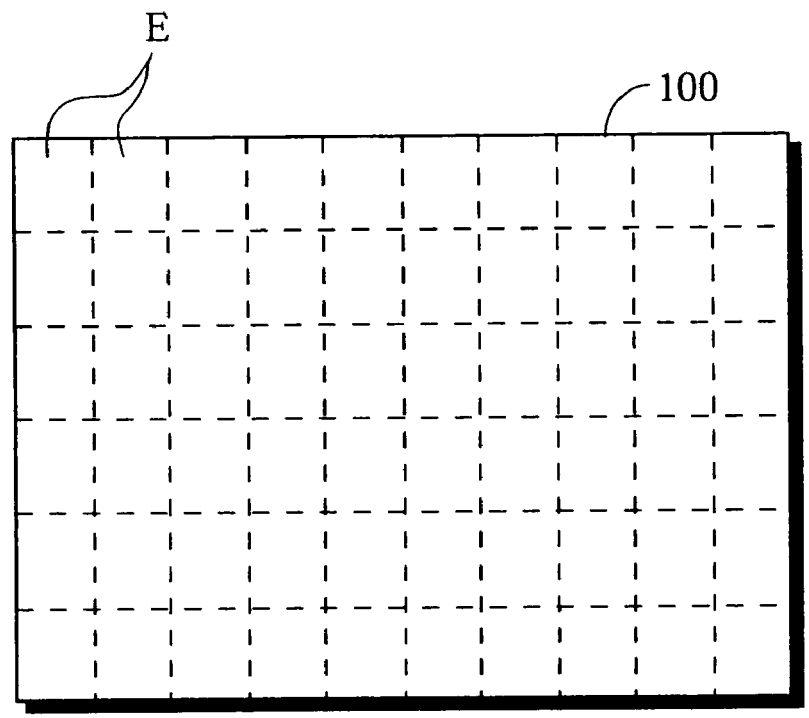
FIG. 2 is a schematic view showing a plurality of detecting areas set in an image area of an imaging device.

The motion vector detecting circuit 8 detects for each frame motion vectors (information relating to the movement) for a plurality of detecting areas E set in an imaging area 100 of the imaging device 2, as shown in FIG. 2, on the basis of a representative point matching method.

Figure 3:
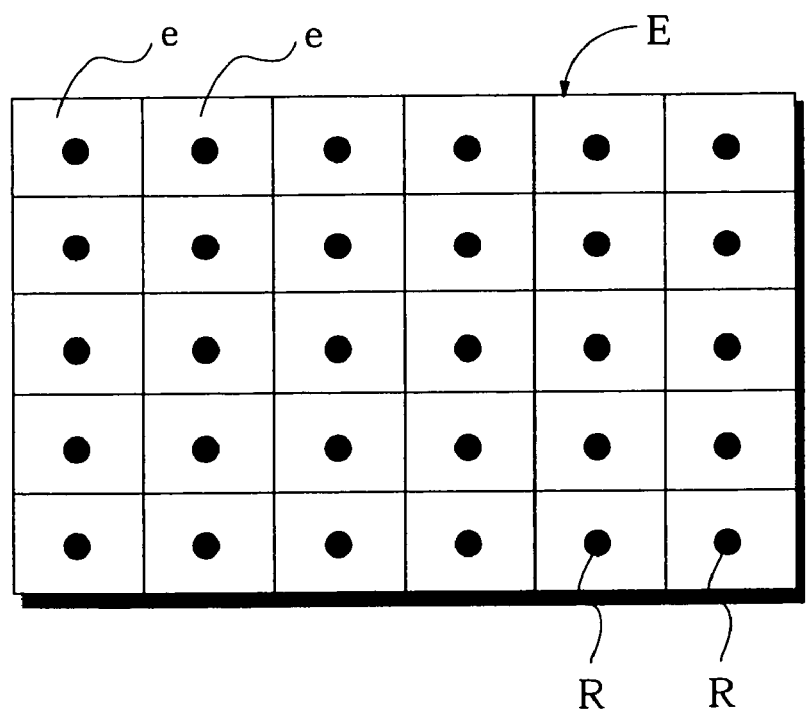
FIG. 3 is a schematic view showing a plurality of small areas in the detecting area shown in FIG. 2.
Figure 4:
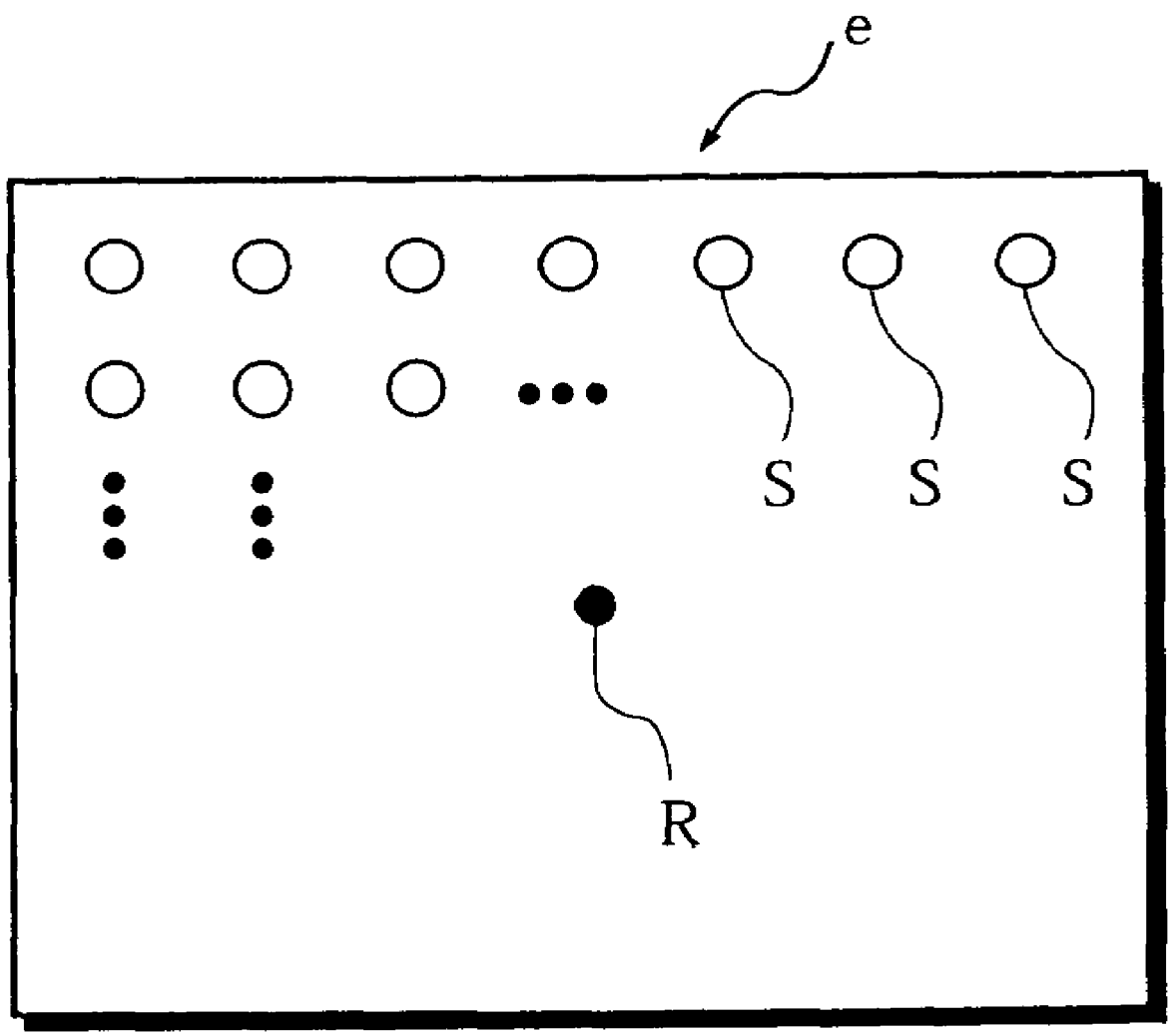
FIG. 4 is a schematic view showing a plurality of sampling points and one representative point which are set in the small area shown in FIG. 3.

More specifically, each of the detecting areas E is further divided into a plurality of small areas e, as shown in FIG. 3. As shown in FIG. 4, a plurality of sampling points S and one representative point R are set in each of the small areas e.

A difference between the image signal level at each of the sampling points S in the small area e in the current frame and the image signal level at the representative point R in a corresponding small area e in the preceding frame, that is, a correlated value at each of the sampling points is found for each of the detecting areas E. For each of the detecting areas E, the sum of correlated values at the sampling points S which are the same in deviation from the representative points R in all the small areas e in the detecting area E is found (a value obtained is hereinafter referred to as an accumulated correlated value). Consequently, accumulated correlated values whose number corresponds to the number of the sampling points S in one of the small areas e are found for each of the detecting areas E.

Deviation of the sampling point S having the minimum accumulated correlated value, that is, the highest correlation in each of the detecting areas E is extracted as a motion vector (the movement of an object) in the detecting area E.

Figure 5:
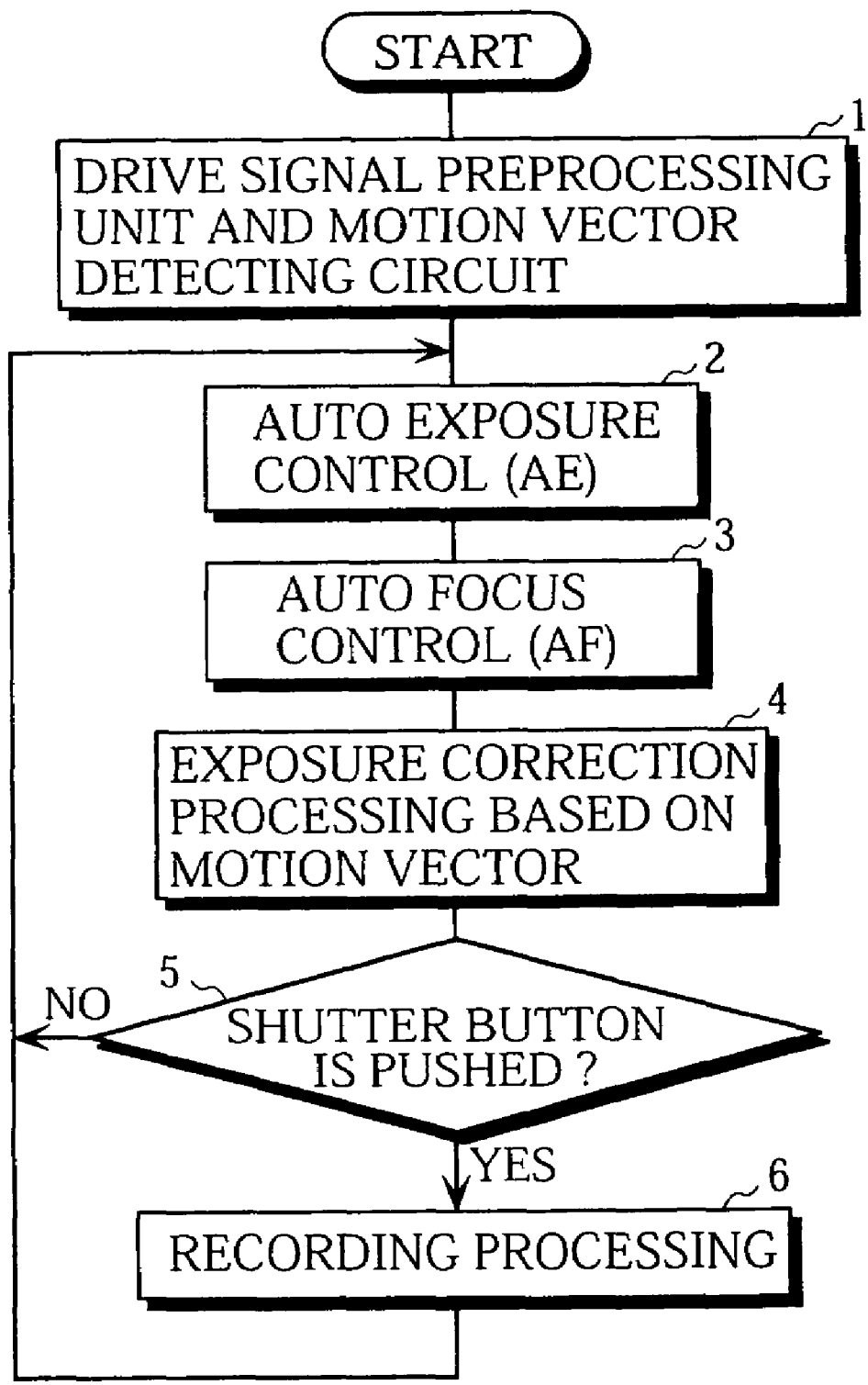
FIG. 5 is a flow chart showing the procedure for processing performed by a microcomputer.

FIG. 5 shows the procedure for processing performed by the microcomputer 20.

When power is turned on, the signal preprocessing unit 51 which is constituted by the CCD imaging device 2, the CDS circuit 3 and the GC circuit 4 is driven, and the motion vector detecting circuit 8 is driven (step 1).

Auto exposure control (AE) is carried out such that proper brightness is obtained on the basis of the output of the GC circuit 4 (step 2), as in the conventional example. That is, the shutter speed and the f-stop value are adjusted. The f-stop value is adjusted by controlling the diaphragm mechanism 12. The shutter speed is adjusted by adjusting time required to store charge in the imaging device 2.

Auto focus control (AF) is carried out (step 3), as in the conventional example. That is, the AF mechanism 14 is adjusted such that a high-frequency component of an image outputted from the GC circuit 4 reaches its maximum.

Exposure correction processing is then performed on the basis of the motion vectors detected by the motion vector detecting circuit 8 (step 4). That is, letting the amount of movement A be the maximum value of the magnitudes of the detected motion vectors, X1 be the shutter speed (sec) adjusted by the auto exposure control, and k be a coefficient, the shutter speed X is corrected, as expressed by the following equation (1):

$$X = \frac{X1}{k \cdot A} \quad (1)$$

The f-stop value F adjusted by the auto exposure control is corrected such that the brightness is k·A times the original brightness. When the f-stop value F is smaller than a predetermined minimum value, the f-stop value is adjusted to its minimum value, and the gain control circuit 4 is controlled such that the gain is increased. When the brightness is insufficient even if the gain is increased to its maximum value, an indication that the strobo mechanism 16 must be driven when the shutter bottom 18 is pushed is stored.

When such exposure correction processing is performed, it is judged whether or not the shutter button 18 is pushed (step 5). When the shutter bottom 18 is not pushed, the program is returned to the step 2. When the shutter bottom 18 is not pushed, therefore, the processing in the steps 2 to 5 is repeatedly performed.

When the shutter bottom 18 is pushed, recording processing is performed (step 6). That is, the main signal processing unit 52 which is constituted by the color separating circuit 5 and the compressing circuit 6 is driven. The strobo mechanism 16 is driven, as required. Image signals corresponding to one frame which are obtained from the imaging device 2 when the shutter bottom 18 is pushed are subjected to color separation processing and compression processing. Obtained compressed data corresponding to one frame are written into the flash memory 7. Thereafter, the driving of the color separating circuit 5 and the compressing circuit 6 is stopped. When the recording processing is terminated, the program is returned to the step 2.

Although in the foregoing step 4, the maximum value of the magnitudes of the detected motion vectors is taken as the amount of movement A, the average value of the magnitudes of the motion vectors detected for the detecting areas may be taken as the amount of movement A. Alternatively, a weighting factor may be previously set for each of the detecting areas, to take as the amount of movement A the average value of the weighting factor times the magnitudes of the motion vectors for the detecting areas.

Although in the above-mentioned embodiment, the recording processing is performed only when the shutter bottom 18 is pushed, images may be successively recorded at predetermined time intervals on storage means or a storage area on which images corresponding to several frames can be recorded, to retain as a still image only the image whose motion vector has the minimum magnitude out of the images recorded in a predetermined range before and after the time point where the shutter bottom 18 is pushed.

Also in a video camera, a motion vector may be detected, to correct the shutter speed, the f-stop value, and so forth which are adjusted by auto exposure control (AE) on the basis of the detected motion vector. Similarly, also in a film camera, an imaging device, a motion vector detecting circuit and a microcomputer may be provided, to correct the shutter speed, the f-stop value, and so forth which are adjusted by auto exposure control (AE) on the basis of the detected motion vector.

Although the present invention has been described and illustrated in detail, it is clearly understood that the same is by way of illumination and example only and is not to be taken by way of limitation, the spirit and scope of the present invention being limited only by the terms of the appended claims.

What is claimed is:

1. A camera apparatus comprising:
    an imaging device;
    a first unit arranged to detect a speed of movement of a subject on the basis of an output of the imaging device;
    a second unit arranged to determine a shutter speed and an f-stop value by an auto exposure control function;
    a third unit arranged to correct the shutter speed determined by the second unit, based on the speed of the movement of the subject detected by the first unit; and
    a fourth unit arranged to correct the f-stop value determined by the second unit, based on the speed of the movement of the subject detected by the first unit.

2. The camera apparatus according to claim 1, wherein the third unit corrects the shutter speed based on X=X1/(k·A), where X1 is the shutter speed determined by the second unit, A is the speed of the movement of the subject detected by the first unit, k is a coefficient and X is a corrected shutter speed.

3. The camera apparatus according to claim 2, wherein the fourth unit corrects the f-stop value determined by the second unit by multiplying the f-stop value by (k·A), where A is the speed of the movement of the subject detected by the first unit, and k is the coefficient.

4. A camera apparatus comprising:

an imaging device;

a first unit arranged to detect a speed of movement of a subject on the basis of an output of the imaging device;

a second unit arranged to determine a shutter speed and an f-stop value by an auto exposure control function;

a third unit arranged to correct the shutter speed determined by the second unit, based on the speed of the movement of the subject detected by the first unit;

a fourth unit arranged to correct the f-stop value determined by the second unit, based on the speed of the movement of the subject detected by the first unit;

a gain control circuit arranged to control a level of an output signal from the imaging device; and a fifth unit arranged to control a gain of the gain control circuit based on the speed of the movement of the subject detected by the first unit.

5. The camera apparatus according to claim 4, wherein the third unit corrects the shutter speed based on $X=X1/(k \cdot A)$, where X1 is the shutter speed determined by the second unit, A is the speed of the movement of the subject detected by the first unit, k is a coefficient and X is a corrected shutter speed.

6. The camera apparatus according to claim 5, wherein the fourth unit corrects the f-stop value determined by the second unit by multiplying the f-stop value by $(k \cdot A)$, where A is the speed of the movement of the subject detected by the first unit, and k is the coefficient.

7. The camera apparatus according to claim 6, wherein the fourth unit comprises a unit which adjusts the f-stop value to a predetermined minimum value when a corrected f-stop value is smaller than the minimum value, and the fifth unit controls the gain control circuit to increase the gain in a case where the fourth unit adjusts the f-stop value to the minimum value.

8. A camera apparatus comprising:

an imaging device;

a first unit arranged to detect a speed of movement of a subject on the basis of an output of the imaging device;

a second unit arranged to determine a shutter speed and an f-stop value by an auto exposure control function;

a third unit arranged to correct the shutter speed determined by the second unit, based on the speed of the movement of the subject detected by the first unit;

a fourth unit arranged to correct the f-stop value determined by the second unit, based on the speed of the movement of the subject detected by the first unit;

a gain control circuit arranged to control a level of an output signal from the imaging device; and a fifth unit arranged to control a gain of the gain control circuit based on the speed of the movement of the subject detected by the first unit; and a sixth unit arranged to control a strobo flashing in a case where a shutter is released, based on the speed of the movement of the subject detected by the first unit.

9. The camera apparatus according to claim 8, wherein the third unit corrects the shutter speed based on $X=X1 (k \cdot A)$, where X1 is the shutter speed determined by the second unit, A is the speed of the movement of the subject detected by the first unit, k is a coefficient and X is a corrected shutter speed.

10. The camera apparatus according to claim 9, wherein the fourth unit corrects the f-stop value determined by the second unit by multiplying the f-stop value by $(k \cdot A)$, where A is the speed of the movement of the subject detected by the first unit, and k is the coefficient.

11. The camera apparatus according to claim 10, wherein the fourth unit comprises a unit which adjusts the f-stop value to a predetermined minimum value when a corrected f-stop value is smaller than the minimum value, and the fifth unit controls the pain control circuit to increase the pain in a care where the fourth unit adjusts the f-stop value to the minimum value.

12. The camera apparatus according to claim 11, wherein the sixth unit drives a strobo mechanism when a shutter button is pressed, in a case where brightness is insufficient even if the gain of the gain control circuit is increased to a maximum value by the fifth unit.

* * * * *